[11] 3,574,445

| [72] | Inventor | Duane D. Harmon |
|---|---|---|
| | | Irondequoit, N.Y. |
| [21] | Appl. No. | 537,773 |
| [22] | Filed | Mar. 28, 1966 |
| [45] | Patented | Apr. 13, 1971 |
| [73] | Assignee | Bausch & Lomb, Incorporated |
| | | Rochester, N.Y. |

[54] SOURCE OF RADIATION
3 Claims, 8 Drawing Figs.

[52] U.S. Cl. .................................................. 350/272,
350/275
[51] Int. Cl. ................................................... G02f 1/30
[50] Field of Search ........................................... 350/6;
350/275, 272; 356/93, 94, 95; 88/14 (FB);
250/233, 219 (IDD); 352/(Inquired)

[56] References Cited
UNITED STATES PATENTS

| 1,672,672 | 6/1928 | Young ......................... | 250/233X |
| 1,877,566 | 9/1932 | Elseg et al ...................... | 250/233X |
| 2,641,956 | 6/1953 | Morrison et al. .............. | 250/233UX |
| 2,703,505 | 3/1955 | Senn ............................. | 88/14(A) |
| 2,761,959 | 9/1956 | Kunins .......................... | 350/272X |
| 3,006,235 | 10/1961 | Brandon ........................ | 250/233X |
| 3,226,557 | 12/1965 | Goodman ...................... | 350/275X |
| 2,507,909 | 5/1950 | Kaysen ......................... | 350/272X |
| 3,417,253 | 12/1968 | Kadah et al .................... | 250/233 |

Primary Examiner—Ronald L. Wibert
Assistant Examiner—Orville B. Chew II
Attorneys—Frank C. Parker, Arthur L. Nelson and Charles C. Krawczyk ABSTRACT: A source of radiation generated from a single light source for optical comparison systems is provided wherein one or more modulated light beams of substantially equal intensity is sequentially directed along a predetermined path so as to pass through a liquid sample.

DUANE D. HARMON
INVENTOR.

BY Charles C. Krawczyk

ATTORNEY

DUANE D. HARMON
INVENTOR.

BY Charles C. Krawczyk

ATTORNEY

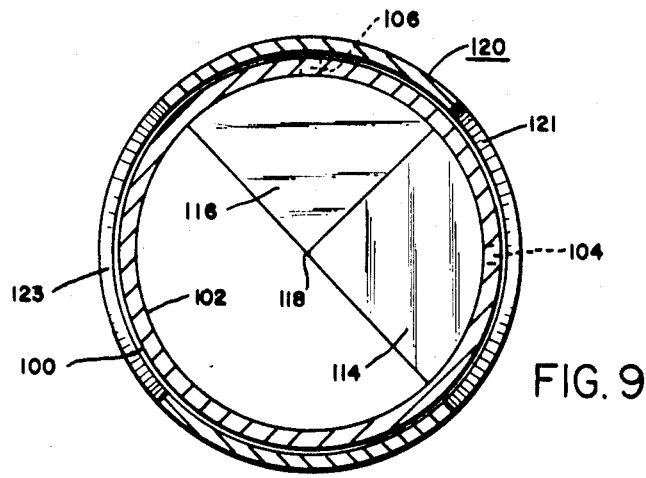
FIG. 9
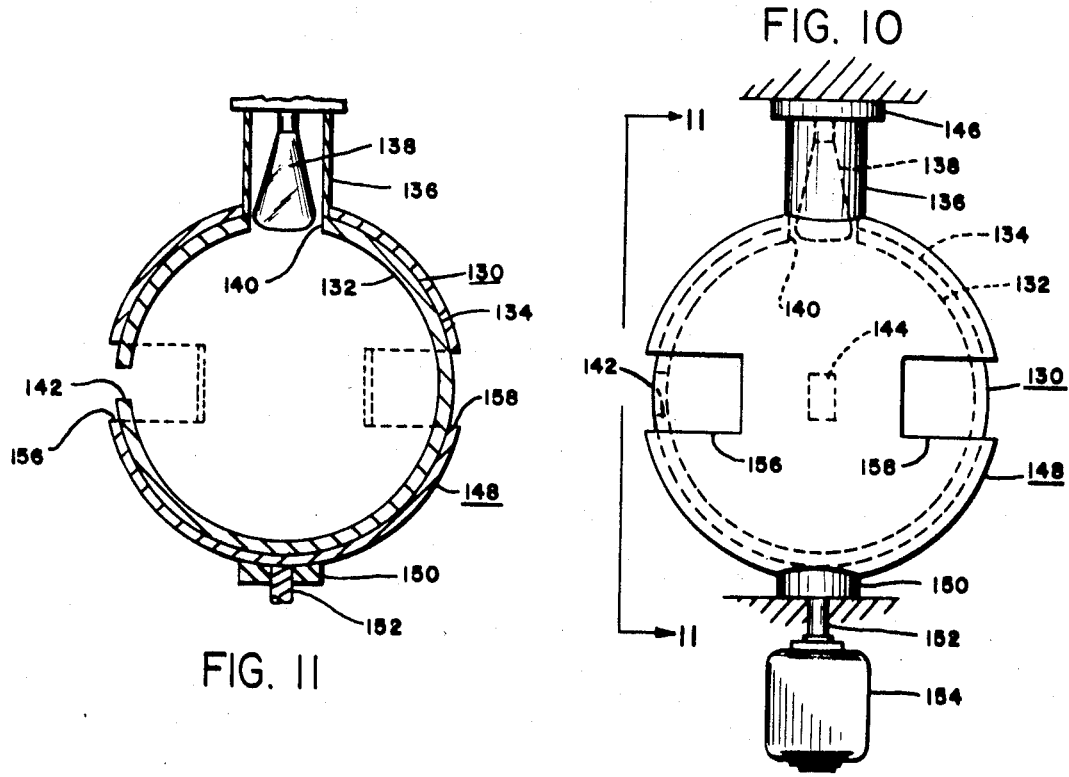
FIG. 10
FIG. 11
DUANE D. HARMON
INVENTOR.
BY Charles C. Krawczyk
ATTORNEY

SOURCE OF RADIATION

This invention relates to a source of radiation for optical comparison systems and more particularly to a source of radiation for dual beam photometers and the like.

Photometric apparatus for analyzing liquid samples to determine the concentration, density, transmission or absorption characteristics thereof, generally require an intense source of radiation so that radiation can be transmitted through the samples to a photosensitive measuring device. This is particularly true in the testing of samples having high optical density wherein a high intensity beam of radiation is required to provide a desirable signal to noise ratio.

In addition to the foregoing, in the case of photometers requiring a plurality of beams, such as a dual beam photometer, time sequenced beams of radiation are required to provide alternating test and sample beams of radiation. The time sequence of these beams must be maintained substantially constant without noticable variation due to instrument use, temperature, etc., so that the beams can be processed with a minimum of timing errors or adjustments. The intensity of the beams should also be maintained at a substantially constant ratio so that comparison-type measurements may be taken over a period of time without errors due to variations in the relative intensity of the beams.

If lamps such as mercury vapor discharge, or carbon arc-type lamps, are employed to provide the required wavelengths at an intense level, the radiation produced by such sources is unstable and has an irregular radiation distribution or gradient that often results in introducing errors. For example, the discharge stream in the mercury vapor lamp wanders about its anode while the arc in the carbon arc lamp generally exhibits a dark area adjacent the negative electrode as well as a wandering effect. If these instabilities are not corrected, the ratio of intensity of a plurality of beams produced therefrom will vary irregularly thereby introducing errors.

Furthermore, where intensity is an important consideration, the use of a stack of interleaved mirrors is undesirable since at least a 50 percent loss in beam intensity results by splitting the beam emanating from the source into two portions. In addition, the stack of interleaved mirrors present an alignment problem in order to provide the desired degree of beam splitting. The rotating mirror beam switch is also undesirable due to possible misalignment or wear that results in a wobble type of effect that attenuates the intensity of the beams.

It is therefore an object of this invention to provide a new and improved source of radiation for photometers and the like.

It is also an object of this invention to provide a new and improved source of radiation for photometric apparatus that is adapted to provide a plurality of beams of substantially equal intensity from a single light source.

It is also an object of this invention to provide a new and improved source of radiation for photometric apparatus including a beam switch providing a plurality of high-intensity modulated beams of substantially equal intensity.

It is also an object of this invention to provide a new and improved source of radiation for photometric apparatus including a beam switch for providing a plurality of modulated beams having any desired time spacing relation.

It is still a further object of this invention to provide a new and improved source of radiation for photometric apparatus that is adapted to include a lamp having a radiation stream that fluctuates in position and transmits a portion of the radiation emanating from the lamp into a plurality of beams of substantially equal intensities.

A source of radiation for photometric apparatus embodying the invention includes a first means defining an enclosure formed with a plurality of spaced openings. A lamp is contained within the enclosure so that the radiation therefrom impinges on the enclosure surface so that a portion of the radiation is transmitted through the plurality of spaced openings in beams of substantially equal intensity. Movably mounted means, such as a shutter or beam switch, is mounted for periodically occluding said openings so that chopped or modulated beams of radiation are transmitted through said openings in a spaced time relation.

A further feature of the invention includes the addition of a reflecting surface within the enclosure for receiving radiation from the lamp and transmitting radiation from substantially the same portion of the lamp through the plurality of openings so that the ratio of intensity of the beams of radiation remains substantially constant even though a varying source of radiation is employed.

A still further feature of the invention is the use of a reflecting device in the form of an integrating sphere so that the intensity of the beams of radiation remains substantially constant if a source exhibiting a wandering effect is employed.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

FIG. 9 is a cross-sectional view of the FIG. 8 taken along line 9—9.

FIG. 10 is a side view of a fourth embodiment of a source of radiation including the invention.

FIG. 11 is a cross-sectional view of the source of radiation in FIG. 10 taken along the line 11—11.

Figure 1:
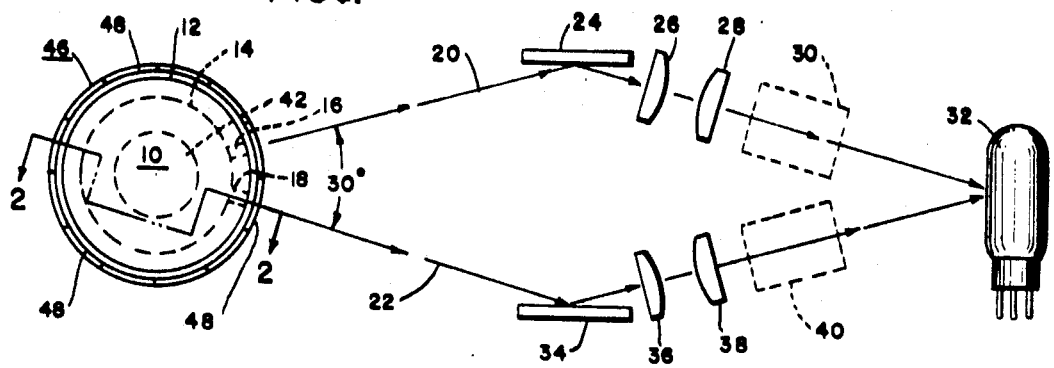
FIG. 1 is an optical schematic diagram of photometric apparatus including a first embodiment of a source of radiation including the invention.

FIG. 1 is an illustration of the optical portion of a dual beam photometric type of analyzing apparatus including a first embodiment of the invention. A source of radiation 10 (embodying the invention) is illustrated as having an enclosure 12 with a cylindrically-shaped outer portion and a cylindrically-shaped hollow interior portion 14 (shown by dashed lines) and two openings 16 and 18 separated by an angle in the order of 30°. A beam of radiation 20 transmitted from the opening 16 is designated for purposes of illustration as the reference beam, while the other beam 22 is designated as the sample beam. Although only two openings are illustrated so that two beams emanate from the source of radiation 10, any number of such beams, modulated or chopped, having various time relations, can be included by additional openings formed with the required angular relationship.

The reference beam 20 is reflected by a plane mirror 24 to pass through a collimating lens 26, a condenser lens 28 and a reference compartment 30 (shown in dashed lines) to the photocathode of a photomultiplier tube 32. The sample beam 22 is reflected by the plane mirror 34 and passes through the collimating lens 36, condenser lens 38, and test sample compartment 40 (shown by dashed lines) to the photocathode of the photomultiplier tube 32. The photomultiplier tube 32 is adapted to be connected to conventional electronic circuitry for processing the electrical signals generated by the photomultiplier, and providing an indication of the concentration, optical density, transmission or absorption characteristics of the sample in the sample compartment 40 in comparison to the sample in the reference compartment.

Figure 2:
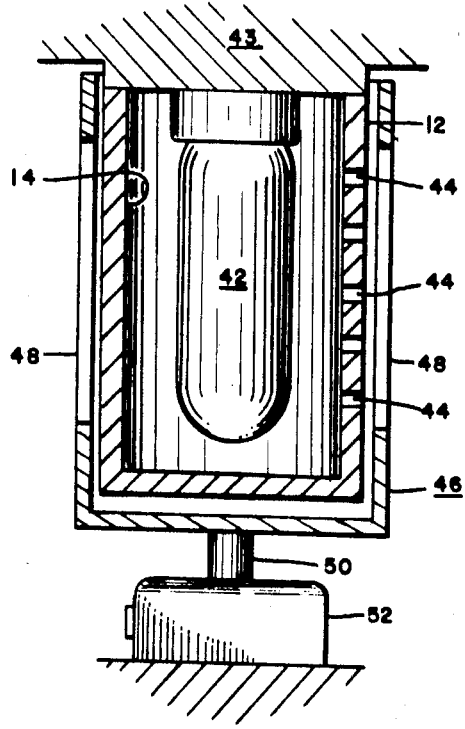
FIG. 2 is a cross-sectional view of the source of radiation of FIG. 1 taken along the line 2—2 including a beam switch motor.
Figure 3:
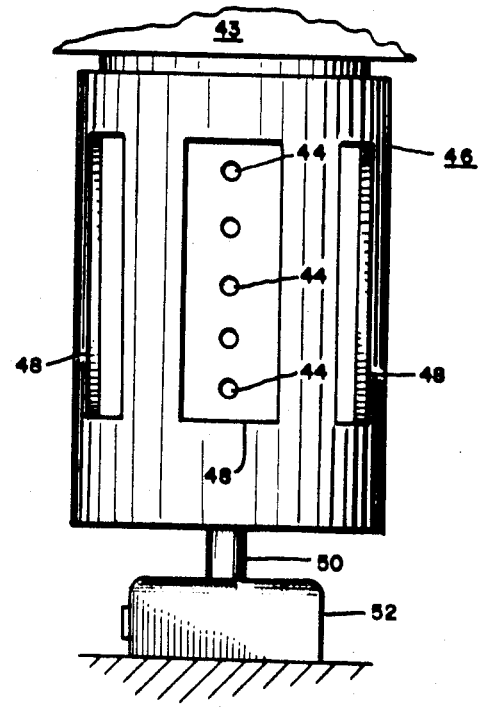
FIG. 3 is a side view of the source of radiation of FIG. 1.

Referring now to FIGS. 1, 2 and 3, a lamp 42 is mounted within the cylindrical inner portion 14 to generate radiation for the source 10. The lamp 42 is illustrated as an elongated tungsten filament lamp mounted to the base 43 and having an axis aligned with the center of the inner portion 14. The openings 16 and 18 each include a plurality of holes 44 (as illustrated in FIGS. 2 and 3) arranged, in the present embodiment, in a straight line and parallel to the axis of the inner portion 14. A rotatable shutter 46 includes a cylindrically-shaped drum mounted in coaxial relation with the cylindrically-shaped outer surface of the enclosure 12 and having a plurality of slits 8 (six in the present embodiment) formed therein. Slits 48 are of sufficient length to allow radiation to emanate from the enclosure 12 from all the holes 44 in a particular line when passing the line of holes.

The shutter 46 is mounted on the shaft 50 of a motor 52. When the motor 52 is energized, the shutter 46 rotates at a constant speed whereby alternate beams of radiation are emitted from the openings 16 and 18. If the slits 48 subtend an arc in the order of 30° and the shutter 46 is rotated at a speed of 600 r.p.m., 60 cycle alternate beams of radiation are generated, 180° out of phase with each other.

Figure 4:
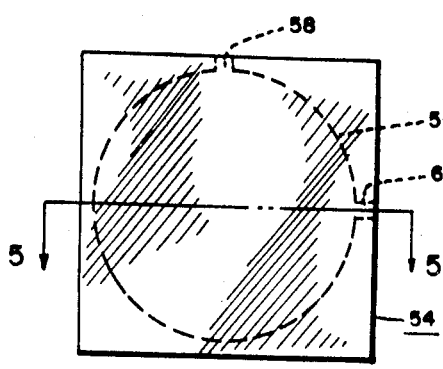
FIG. 4 is a top view of a second embodiment of a source of radiation including the invention.
Figure 5:
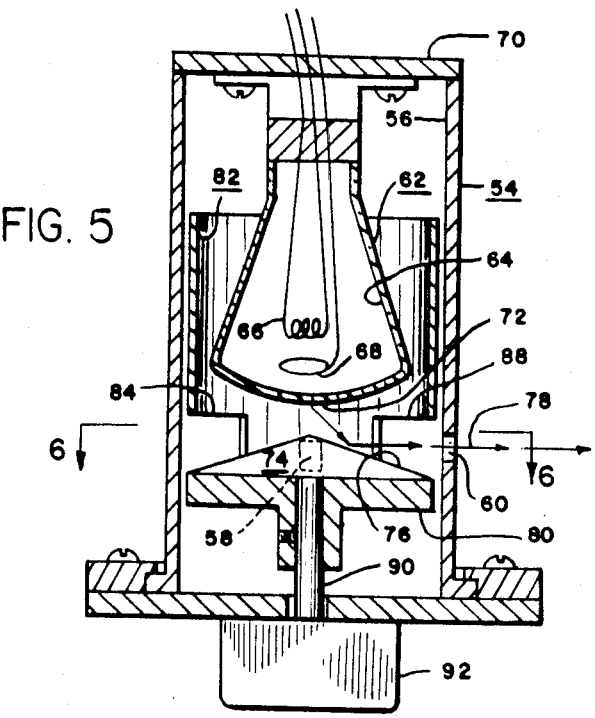
FIG. 5 is a sectional view of the source of radiation of FIG. 4 taken along the line 5—5.
Figure 6:
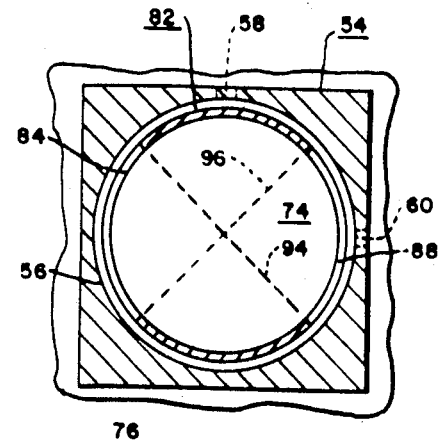
FIG. 6 is a cross-sectional view of FIG. 5 taken along the line 6—6.

Referring now to the second embodiment in FIGS. 4, 5 and 6, an enclosure 54 has a square exterior shape with a cylindrically-shaped hollow inner portion 56 (shown by dashed lines in FIG. 4) and two exit slits 58 and 60 separated by an angle in the order of 90°. A lamp 62 is mounted within the cylindrical portion 56 (FIG. 5) to generate radiation for the source. The lamp 62 is illustrated as a mercury vapor discharge stream type of lamp having a coating 64 on the inner portion of its enclosure to provide the desired wavelength of radiation. The lamp 62 includes a heated cathode 66 and an anode 68, across which a potential is applied (not shown) so that the high intensity discharge stream is formed therebetween. As previously mentioned, this type of lamp exhibits a wandering effect wherein the discharge stream wanders about the anode 68 thereby providing an unstable source of radiation if condensed directly into a beam.

The lamp 62 is mounted to a mounting base 70 so that the radiation from a surface 72 impinges on a cone-shaped reflecting means 74. The cone-shaped reflecting means 74 includes a reflecting surface 76 that effectively transmits the light emanating from the same portion of the lamp surface 72 through the slits 58 and 60 in a manner as illustrated by the arrow 78.

The cone-shaped reflection means 74, in the embodiment of FIG. 5, is mounted on a base 80 of a rotatable cylindrically-shaped shutter 82, which shutter is mounted in coaxial relation to the cylindrical inner portion 56. The shutter 82 is formed, in the present embodiment, with two rectangularly-shaped openings 84 and 88 in a manner that the openings pass between the slits 58 and 60 and the cone-shaped reflecting surface 76 as the shutter 82 is rotated. The shutter base 80 is mounted on the shaft 90 of a motor 92. When motor 92 is energized, both the cone-shaped reflection means 74 and the shutter 82 are rotated so that chopped or modulated beams of radiation of substantially equal intensity are transmitted through the slits 58 and 60.

As illustrated in FIG. 6, the openings 84 and 88 in the shutter 82 are diametrically opposed and include an arc in the order of 90° (as illustrated by the dashed lines 94 and 96). With the motor 92 rotated at 1800 r.p.m., chopped beams of radiation are transmitted through the slits 58 and 60 (located 90° apart with respect to the axis of rotation of the cone-shaped reflector 74) at a 60 cycle rate and 180° out of phase with each other. It is to be understood, of course, that any number of beams having various phase relations can be generated from the source by merely including slits at the required angle with respect to a reference slit. Furthermore, the speed at which the motor 92 drives the shutter 82 can be easily changed to provide any desired cyclic beam switching rate.

Figure 8:
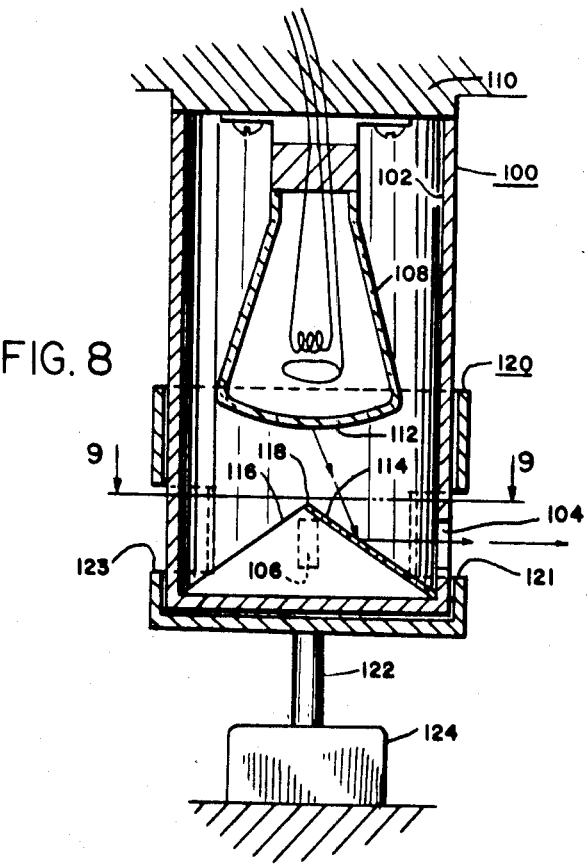
FIG. 8 is a cross-sectional view of the FIG. 7 taken along line 8—8.
Figure 7:
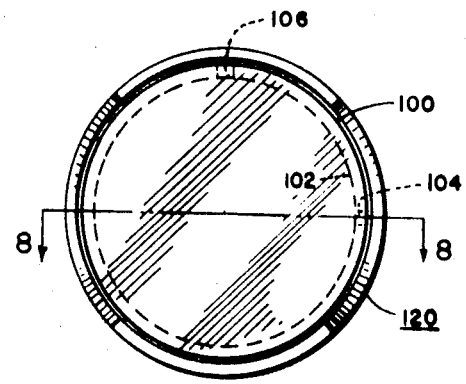
FIG. 7 is a top view of a third embodiment of a source of radiation including the invention.

The embodiment of FIGS. 7, 8 and 9 includes a source of radiation with a stationary reflecting means. The source of radiation is illustrated as having an enclosure with a cylindrical outer portion 100 and an inner portion 102 and two exit slits 104 and 106 separated by an angle in the order of 90°. A lamp 108 is mounted within the cylindrical inner portion 102 to generate radiation for the source. The lamp 108 is of the same type as previously described with regard to FIG. 5.

The lamp 108 is mounted on the mounting base 110 so that radiation from the lamp surface 112 impinges on a pair of triangularly-shaped reflection surfaces 114 and 116. The triangularly-shaped reflecting surfaces 114 and 116 are mounted within the inner portion 102 so that they form an apex 118 extending towards the lamp 108. The triangularly-shaped reflecting surfaces 114 and 116 receive radiation from the surface 112 and reflect a portion through the exit slits 104 and 106 respectively. The radiation reflected through the exit slits 104 and 106 is of substantially equal intensities since the reflecting surfaces 114 and 116 are so mounted that the radiation from the same portion of the surface 112 is reflected through both the exit slits 114 and 116. Any variation in radiation intensity exhibited at the reflected surface portion of surface 112 will change the intensity of the beams transmitted through the exit slits 104 and 106 equally thereby maintaining the beams' balance.

A cylindrically-shaped shutter 120 is mounted to rotate on the shaft 122 of a motor 124 and is in coaxial relation with the outer cylindrical portion 100 of the enclosure. The shutter 120 includes a pair of rectangularly-shaped openings 121 and 123 similar to that described in regards to the shutter of FIGS. 4—6. As the shutter 100 is rotated by the motor 124, the openings 121 and 123 pass adjacent the exit slits 104 and 106 to allow chopped beams of radiation to emanate from the source of radiation in a predetermined time and phase relation as previously described with regards to FIGS. 4—6.

FIG. 10 is an embodiment of the invention wherein the reflection means takes the form of an integrating sphere. The source of radiation is illustrated as having an enclosure 130 with spherically curved inner and outer surfaces 132 and 134 and a cylindrically-shaped extension 136. A lamp 138, similar to that described with regards to FIG. 5, is mounted within the extension 136 so that a portion thereof extends through an opening 140 in the sphere 130. The sphere 130 is also formed with a pair of exit slits 142 and 144 separated by an angle in the order of 90°. The inner surface 132 is made of a highly reflective material so that the surface acts as an integrating sphere wherein the radiation that is transmitted through the slits 142 and 144 is of substantially constant intensity regardless of the wandering effect of the lamp. The sphere 130 is mounted to a base 146 through the extension 136.

A spherically-shaped shutter 148 is mounted in coaxial relation with the outer surface 134 of the sphere 130. The shutter 148 is held in position by a bearing 150 and is coupled to rotate with the shaft 152 of a motor 154. The shutter 148 includes a pair of rectangularly-shaped openings 156 and 158 aligned with respect to the slits 142 and 144, so that as the shutter 148 is rotated, the openings 156 and 158 pass adjacent the slits 142 and 144 so that they are periodically occluded to allow chopped beams of radiation having a predetermined time and phase relation to emanate from the slits as described with regards to FIGS. 4—6. Although the enclosure 130 is illustrated as having a spherical outer surface, it is to be understood that the outer surface can take the form of any curved surface which can, for example, be cylindrical as illustrated in FIGS. 1—3 and 7—9.

It should be noted the source of radiation included in the embodiments of FIGS. 4—11 has the advantage of being able to use high-intensity lamps, such as mercury vapor discharge lamps, or carbon arc lamps, wherein the discharge beam or arc varies in position and in intensity and still produce a plurality of beams of substantially equal intensity. The cone and triangular reflection means of FIGS. 4—9 are mounted to reflect radiation from essentially the same portion of the lamp through both exit slits. Any variation in radiation intensity is thereby substantially equally transmitted through both exit slits keeping the intensity of the beams transmitted therethrough substantially equal. The integrating sphere inner surface 132 reflects the light from the lamp in a manner so that the beams transmitted through the slits are constant.

In addition, the exit slits of the sources of FIGS. 1—9 are mechanically stationary, so that the time or phase relation between the chopped beams of radiation emanating from the source is only a function of the speed of rotation of the motor thereby providing a constant time or phase relation between the chopped beams that does not vary with time, use, etc. A very sharp rise time is also provided for the chopped beams of radiation since the openings in the shutter are mounted directly adjacent the slits thereby providing a substantially on-off type of beam modulation.

I claim:

1. A source of modulated radiation for photometric apparatus comprising:
   a. an enclosure having a plurality of spaced openings therein;
   b. a source of radiation mounted within said enclosure;
   c. shutter means movably mounted for periodically occluding said openings;
   d. reflecting means for reflecting radiation from said source mounted within said enclosure and arranged therewithin to reflect the radiation through each of said plurality of openings with substantially equal intensity; and
   e. the reflecting means comprises a plurality of triangularly shaped reflecting surfaces arranged and mounted to form a cone, the apex of which extends toward said source of radiation.

2. The source of radiation as defined in claim 1 wherein:
   a. the outer surface of said hollow enclosure is cylindrically shaped; and
   b. said shutter means further comprises a hollow cylinder having an aperture therethrough, said cylinder being movably mounted about the outer surface of said inner enclosure in a coaxial relation therewith, so that radiation is transmitted from said source whenever said aperture is moved past an opening in said enclosure.

3. The source of radiation as defined in claim 2 which further comprises a constant speed drive to which is connected said hollow cylinder for rotation therewith.